United States Patent [19]

Engle

[11] 3,954,304
[45] May 4, 1976

[54] EMERGENCY AND HANDBRAKE CONTROL SYSTEM

[75] Inventor: Thomas Engle, Cape Vincent, N.Y.

[73] Assignee: General Signal Corporation, Rochester, N.Y.

[22] Filed: June 17, 1974

[21] Appl. No.: 480,440

[52] U.S. Cl. .............................. 303/13; 188/170; 303/2; 303/9; 303/15; 303/68
[51] Int. Cl.² ............................................. B60T 13/00
[58] Field of Search .................. 188/170, 358, 359; 303/13, 2-3, 15, 68, 9; 92/63, 64

[56] References Cited
UNITED STATES PATENTS

| | | | |
|---|---|---|---|
| 3,443,839 | 5/1969 | Hinrichs et al. | 303/13 X |
| 3,456,988 | 7/1969 | Gibbons et al. | 303/9 X |
| 3,463,276 | 8/1969 | Brooks, Jr. | 188/170 X |
| 3,536,360 | 10/1970 | Engle | 303/15 X |
| 3,695,731 | 10/1972 | England et al. | 188/170 X |
| 3,707,309 | 12/1972 | Engle | 188/265 X |
| 3,802,746 | 4/1974 | Walser | 188/170 X |

Primary Examiner—Trygve M. Blix
Assistant Examiner—Douglas C. Butler
Attorney, Agent, or Firm—Pollock, Vande Sande & Priddy

[57] ABSTRACT

A combined emergency and handbrake system employs a friction brake actuator having a spring motor in addition to a hydraulic service motor. The spring motor is restrained from operation by a second hydraulic motor which is normally maintained at operating pressure. By venting the second motor, the spring motor applies the friction brake. This provides failsafe operation for the emergency system, and a positive handbrake system when the car is parked with a de-energized or uncoupled pressure source. The second fluid motor is normally pressurized by application of fluid pressure to the hydraulic service motor. The handbrake may therefore be released by cycling the service brake. This eliminates a need for a second hydraulic or pneumatic actuator for the emergency and handbrake system and assures the safe operation of the car by operation of the service brake before the parking brake can be released. A mechanical retraction device is also provided for special situations.

10 Claims, 4 Drawing Figures

EMERGENCY AND HANDBRAKE CONTROL SYSTEM

BACKGROUND OF THE INVENTION

The present invention relates to a combined emergency and handbrake control system for use on a light rail vehicle, and more particularly, a mass transit or rapid transit car. Braking systems for these vehicles have in recent years adopted a spring-applied brake motor for emergency and handbrake use. The spring motor provides a redundant "fail-safe" mode of operation that will insure a friction brake application even if the control system is entirely inoperative. Likewise, the spring-applied brake is useful as a parking or handbrake since it retains its braking capability even when the control system is disconnected or inoperative. If each individual car carries a self-contained brake system, the spring-applied brake will still be operative when all pneumatic pressure or hydraulic pressure has left the system. Likewise, if the vehicle is part of a train of vehicles employing a single compressor, the brake system will still be effective even when the car is disconnected from its source of pneumatic pressure.

The prior art systems for using spring-applied brakes have normally employed a separate control system to actuate a pneumatic or hydraulic motor which restrains a spring motor. In the case of a pneumatic spring-applied booster, a separate control system and a control valve is required. In the case of a separate hydraulically restrained spring motor, a separate booster or pneumatic to hydraulic convertor has been required.

The present invention obviates the need for a separate pneumatic or hydraulic control system to restrain the spring motor.

OBJECTS OF THE INVENTION

It is therefore an object of the present invention to provide an improved emergency and handbrake control system that eliminates the need for a separate pneumatic or hydraulic control system. Although separate hydraulic motors are still used, one for service brake applications, and the other for restraining the spring motor, a single pressure source is used. The hydraulic pressure generated during service applications is used to pressurize the hydraulic motor that restrains the spring motor. The service brake line is manifolded to both the service brake hydraulic actuator, and to the hydraulic motor restraining the spring motor. By incorporating a check valve in the line of the second hydraulic motor, the initial pressurization is sufficient to maintain the spring motor in its compressed or contracted position after the service application has been terminated. An electrically operated magnet valve is used to bypass the check valve when an emergency or handbrake application is desired.

Another object of the present invention is to provide an emergency and handbrake control system in which each cycling of the service brake system re-establishes the hydraulic pressure required to restrain the spring motor which actuates the emergency brake, thereby minimizing the changes in the position of the spring motor due to leakage of hydraulic fluid.

The present invention provides braking capability in the event of total failure in the pneumatic or hydraulic control system. By actuating the exhaust valve, the hydraulic pressure in the second fluid motor is vented, and the spring motor is allowed to apply the friction brakes. The parking brake may also be used when the hydraulic or pneumatic system is either de-energized or disconnected from the vehicle. This is necessary since normal leakage from a hydraulic motor would deplete the operating pressure in the brake actuator if the system were allowed to stand for a prolonged period.

The present invention also provides a second important feature. When spring actuators are combined with normal fluid pressure actuators, some provision must be made for equalizing pressures during emergency applications. For any given load, an excessive application of service pressure will cause locking of the wheels, and skidding along the tracks. In conventional control systems, for which the present invention is intended, a separate load-weigh apparatus is provided to vary the maximum service pressure available to the service brake control system. This insures that the brake system will not lock the wheels and cause skidding. However, if a maximum service application is being made when the emergency brakes are applied, the addition of the spring motor to a full service application will cause locking and skidding, unless some provision is made to insure that the intended maximum pressure is not exceeded. By manifolding the service brake line and the emergency brake line together at the exhaust valve,, the spring actuator is restrained from applying its full operating pressure so long as the service actuator is pressurized. The amount of restraint is proportional to the amount of service application. This proportional amount is effectively subtracted from the pressure generated by the spring actuator to insure that the totel braking force applied to the brakehead does not exceed a predetermined value.

Since the apring motor actuated parking brake is normally deactuated by cycling the service brake, the parking brake may be deactuated only when the service brake system is experiencing large hydraulic fluid losses due to leakage, application of pressure will be developed to deactuate the parking brake and the car having a defective service brake system will not be able to move unless the parking brake is manually deactuated.

DETAILED DESCRIPTION OF THE DRAWINGS
exhaust valve,

DETAILED DESCRIPTION OF THE PREFERRED EMBODIMENT

Figures 1, 2:
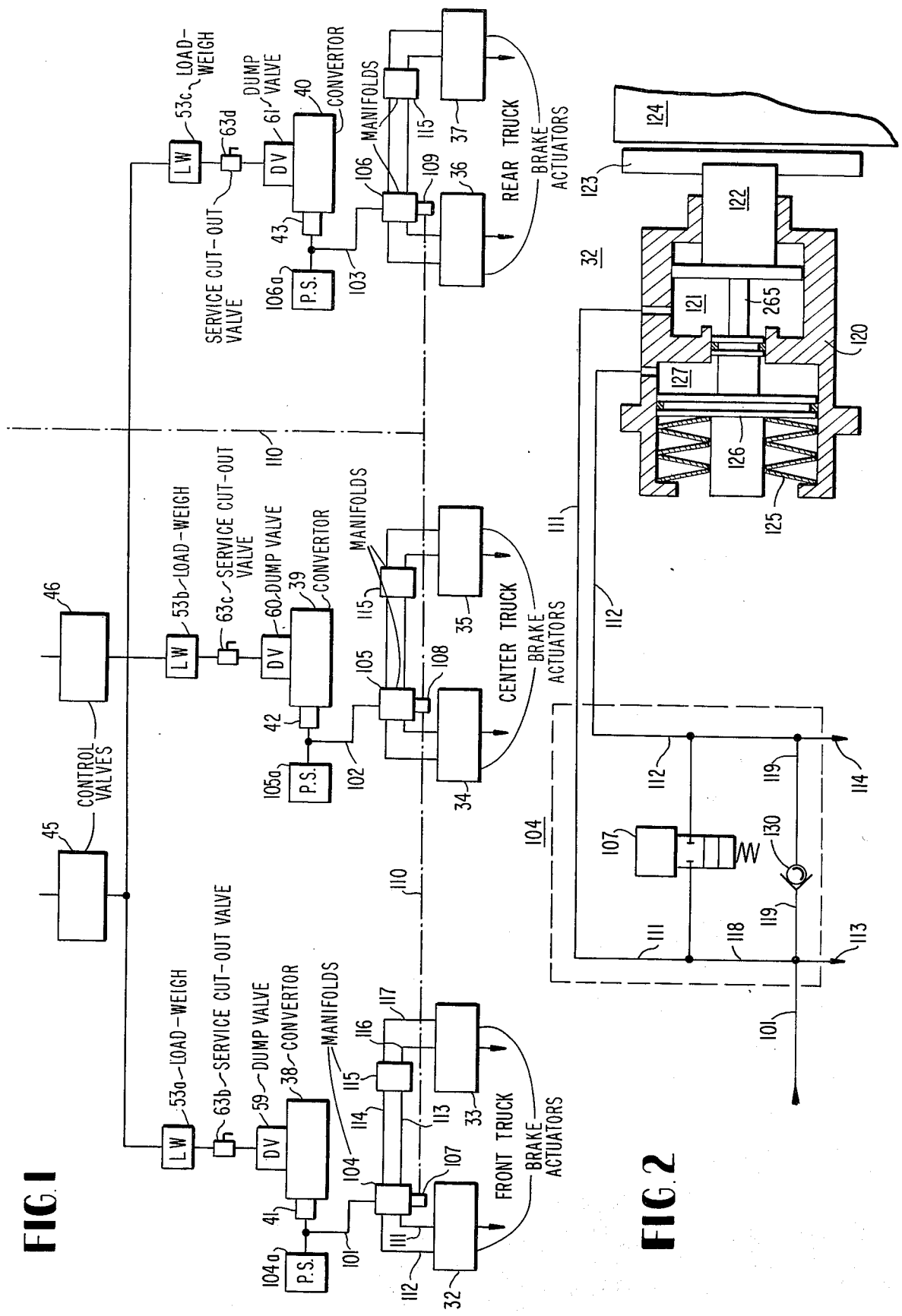
FIG. 1 is a schematic diagram of the present invention as incorporated in a braking system for a light rail vehicle.
FIG. 2 is a schematic diagram of the emergency hand brake control system.

Referring to FIG. 1, the emergency hand brake and control system is illustrated in conjunction with a braking system for a light rail vehicle. In this braking system, two separate pneumatic control valves 45 and 46 are employed to regulate a pneumatic control pressure. Control valve 45 regulates the brake pressure supplied to the front and rear trucks of the vehicle, while control valve 46 regulates the braking pressure applied to the center truck. The braking effort applied by control valve 45 is a blended brake application involving a reduction in friction braking which corresponds to the amount of braking supplied by dynamic brakes on the front and rear trucks. The brake pressure applied by control valve 46 is non-blended and is a full service application regardless of the amount of dynamic braking generated by the decellerating vehicle.

For each of the trucks, the control pressure is regulated by load-weigh valves 53a, b and c. Since the system is intended for use on a light-rail vehicle such as a mass transit car, the load-weight valves are necessary to take into account the wide disparity in weight-to-load ratios. Since the amount of force required for effecting a given deceleration rate for a heavily loaded vehicle will cause the wheels of a lightly loaded vehicle to slide on the rails, it is necessary to use a proportional braking system that will limit the maximum braking effort of the friction brake in accordance with the weight of the vehicle. The vehicle is equipped with air springs or an air spring suspension system which provides a pressurized indication which is representative of the load carried by the vehicle. This representative pressure is then used to regulate the amount of air pressure available to the friction brake system. The brake system illustrated in FIG. 1 is also equipped with service cut-out valves 63b, c and d, and wheel slip dump valves 59, 60 and 61. The service cut-out valves are intended to completely de-energize the service portion of the braking system in the event of a malfunction. The vehicle may then be towed to a repair facility.

The control system illustrated in FIG. 1 is also equipped with pneumatic to hydraulic convertors 38, 39 and 40, and their associated hydraulic slack adjustors 41, 42 and 42. These convertors amplify the pneumatic control pressure and supply hydraulic fluid under pressure to the friction brake actuators. The hydraulic lines 101, 102 and 103 have fitted thereto pressure switches 104a, 105a and 106a. These pressure switches are connected to annunciators in the control center to alert the operator of the vehicle in the event of a brake malfunction. Upon noting the malfunction, the operator may elect to continue the regular service brake application, or to activate the emergency brake system. Additionally, the pressure switches and annunciators will alert the operator to a brake or brake control system that has failed to release.

Each of the hydraulic lines 101, 102 and 103 is connected to a manifold block 104, 105 and 106. These manifold blocks will be further illustrated and described with respect to FIGS. 2 and 3. Manifold blocks 104–106 also include magnetic magnet valves 107, 108 and 109 which are operated by an electrical signal impressed on signal control line 110. The signal control line 110 leads to the operator's console and is used to connect the operating controls for the emergency system and handbrake system with magnetic valves 107–109.

The output of manifold blocks 104–106 goes to brake actuators 32–37. These actuators have a first hydraulic motor for service brake applications, and a spring motor for emergency and handbrake applications. The spring motor is normally restrained by a second hydraulic motor. The actuators are more fully discussed with respect to FIG. 3. Actuator 32 is connected to manifold 104 via service brake line 111 and emergency and handbrake control line 112. Conduit 111 defines a first supply line for the service brake actuator, while line 112 provides a second supply line for the second hydraulic motor. Likewise, first supply line 113 and second supply line 114 lead to a second manifold 115 which supplies the hydraulic pressure for actuator 33. This hydraulic pressure is supplied along service conduit 116 and emergency and handbrake conduit 117. The use of the first and second supply lines and their associated manifolds is duplicated for each of the remaining actuators 34–37.

The interior piping of manifold 104 is more fully illustrated in schematic form in FIG. 2. The incoming supply conduit 101 supplies hydraulic fluid under pressure to junction 118. A portion of the fluid is diverted through the first supply lines 111 and 113 to the service brake portions of actuators 32 and 33. An additional portion of the fluid may be diverted along conduit 119 to to the emergency and handbrake control system.

Figure 3:
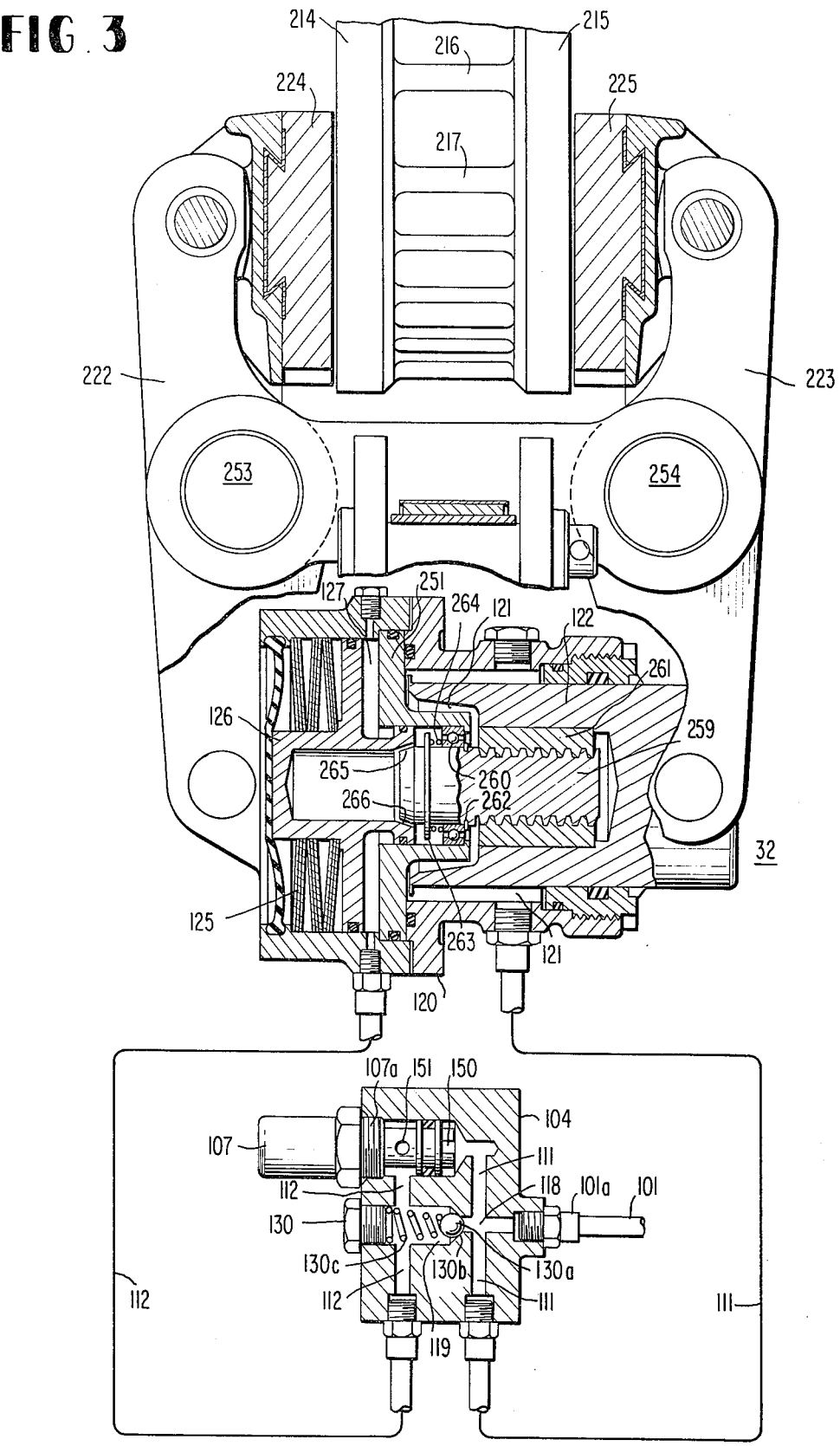
FIG. 3 is a partially cross-sectioned view of the present invention illustrating the emergency hand brake control system and the spring-applied brake actuator.

The hydraulic actuator 32 is illustrated in a schematic manner in FIG. 2, and in a cross-section in FIG. 3. As illustrated in FIG. 2, the actuator includes a housing 120, and a first fluid motor 121 for supplying a service brake application. As motor 121 is pressurized, piston 122 is displaced to the right as illustrated in FIG. 2 to bring disc pad 123 into engagement with disc 124.

Actuator 32 also includes a spring motor 125 which exerts pressure against piston 126, connecting rod 265 and piston 122 to bring disc pad 123 into engagement with disc 124. Hydraulic motor 127 urges piston 126 to the left as illustrated in FIG. 2. This restrains spring motor 125 and renders it inoperative during service applications. Thus under normal operating circumstances, if the first hydraulic motor 121 is pressurized, a service brake application is effected. If the second hydraulic motor 127 is de-pressurized, an emergency or handbrake application is effected by spring motor 125.

The second hydraulic motor 127 is normally pressurized through line 112 by means of manifold 104. The first and second supply lines 111 and 112 are interconnected by means of a pressure-responsive check valve 130 mounted in the interconnecting passageway 119. As a service brake application is made, line 101 is pressurized. This pressure also pressurizes line 119. When the pressure in line 119 is higher than the pressure in 112, the pressure-responsive valve 130 is opened, and hydraulic fluid under pressure flows to the second fluid motor 127. When the pressure is equalized between lines 111, and 112, the pressure-responsive check valve 130 closes. This prevents any transfer of hydraulic fluid back from line 112 to 111 when the service brake application is terminated. After termination, the pressure in line 111 is essentially zero, while the pressure maintained in line 112 is equivalent to the service brake application pressure. Since, in practice, the service brake application varies depending upon the weight of the load carried by the vehicle, the pressure present in lines 101 and 111 also varies. The pressure in line 112, however, is equivalent to the highest service brake application previously made, less any leakage from hydraulic motor 127 and/or check valve 130. Since some leakage is inevitable, the system relies on each succeeding service brake application to restore the pressure in the second fluid motor 127 to a level sufficient to prevent the application of spring motor 125.

The system also includes an exhaust valve for exhausting the fluid pressure maintained in conduit 112. when it is desired to make an emergency or handbrake application, exhaust valve 107 is opened and the pressure in conduit 112 is allowed to equalize with the pressure in conduit 111. It is important to note the pressure present in the second hydraulic motor 127 is not dumped, but is rather equalized with any pressure present in the service brake line 111. If the pressure in conduit 112 were dumped the emergency piston force would add to the service brake force and result in a total brake force more than double that required to stop the car. This would simply lock the wheels and lengthen the stopping distance. That is, if a service brake application is in effect at the time the emergency brake application is made, the addition of the pressure generated by spring motor 125 to the existing service pressure would undoubtedly cause the brake to lock and the wheels of the vehicle to slide. Since this would increase the stopping distance, provisions are made for equalizing the pressure, rather than dumping it.

It is essential in establishing the emergency brake pressure, that the minimum and maximum service brake pressures be accurately calculated. The minimum service brake pressure supplied under the lightest of load conditions must be sufficient to overcome the spring motor and restrain it under all conditions. It is also necessary that the spring motor be able to exert braking force equal to that applied during service brake applications to the most heavily laden cars. In other words, the spring motor must be capable of supplying a full service application under full load conditions, but must be restrained from application by pressure equivalent to that applied during the lightest of load conditions. This is done by using differentially sized pistons in hydraulic motors 121 and 127. As illustrated in FIG. 2, the effective square area of piston 122 is substantially less than the effective square area of piston 126. The spring motor 125 may then be sized to generate hydraulic pressure equivalent to the maximum hydraulic pressure used in the service application of motor 121. By using a larger piston for spring retention, a smaller service pressure applied during light load conditions will still compress spring motor 125 and restrain it from application. If it is assumed that the smallest service brake application pressure will be 600 pounds per square inch, it would be desirable to size the second hydraulic motor 127 to provide for the full retraction of spring motor 125 when 550 pounds per square inch of pressure is applied. The addition of any subsequent pressure up to and including 1,000 pounds per square inch will only cause further compression of piston 251 against the stop on casing 303.

If the spring motor 125 is intended to provide a force equivalent to a full load service application or a hydraulic pressure of 1,000 pounds per square inch, it will be necessary to reduce the force applied by the emergency system if an emergency application is made during a service brake application. If the normal service brake application is equivalent to 700 pounds per square inch, the addition of an extra 1,000 pounds per square inch from spring motor 125 would immediately lock the brakes and cause the vehicle wheels to skid. To prevent this, the exhaust valve 127 equalizes pressure between the first and second supply lines 111 and 112.

If it is assumed that an emergency application is made during a service application, valve 107 is opened with approximately the same pressure present in both the first and second supply lines 111 and 112. The pressure-responsive check valve 130 will insure that the pressure in line 112 is at least equivalent to the pressure in line 111. If an emergency application is made during a service brake application, equivalent pressures will be present in both lines, and the spring motor 125 will be restrained from applying any additional pressure to piston 122. This will prevent any excessive amount of service brake application to the brake disc 124. If, however, the pressure is failing in the service brake application line 111 and an emergency brake application is made, the spring motor will be applied when the hydraulic pressure present in lines 111 and 112 drops below that normally required for a full service application on a lightly loaded car. However, the amount of brake application will still be tempered, but will always produce a brake force greater than that required for an empty car. If the pressure present in service line 111 drops to 300 pounds per square inch, the differential between 300 pounds per square inch and the application pressure for spring motor 125, that is 550 pounds per square inch, will, when multiplied by the piston area of the second spring motor, give the force that the spring will produce. As the area of the second piston is roughly twice that of the service piston, pressure deficiency below the full service pressure will be made up twice by the spring brake. Thus, in this example, the pressure deficiency equivalent to 300 psi causes a spring brake application force of approximately 600 psi to be added to the still existing 300 psi service brake force, providing braking force equal to 900 psi service pressure. The additional spring brake force will be applied to piston 122 by spring motor 125. Any further drop in the pressure present in service line 111 will result in a further application of pressure from spring motor 125.

When it is desired to use the control system to actuate the hand brake, valve 107 is opened, and the hydraulic fluid in fluid motor 127 is allowed to dissipate into line 101. This insures that the parking brake will remain fully applied even if the source of hydraulic pressure is de-energized, or if the pneumatic or hydraulic control means for the vehicle truck is disconnected. In actual practice, a mechanical device (not shown in FIG. 2) is used to retract the handbrake in the event it is desired to move the car without energizing the brake control system.

The handbrake is released by actuating the service brake, and cycling the service brake through two or three applications. The cycling of the service brake, and the imposition of fluid pressure on conduit 101 will pressurize fluid motor 127 through one-way valve 130 and the second supply line 112.

In the preferred embodiment of the invention, the fluid motor 127 is sized so as to fully release the spring motor 125 with a single service application. However, it would be possible to use smaller capacity slack adjustors 41–43, and cycle the service brake system two or three times to insure the hydraulic motor 127 is fully pressurized, and that spring motor 125 is fully retracted.

The Hydraulic Brake Actuator

FIG. 3 is a partially cross-sectioned view of the emergency and handbrake control system together with the disc brake actuator 32. In the preferred embodiment of the invention, the brake system employs disc brakes and hydraulic actuators. Although it would be possible to use pneumatic actuators in a conventional brake system, the use of hydraulic actuators and disc brakes provides the precise control that is needed for a fast-response brake system. It also provides a substantial reduction in the space required for mounting the cylinders. As illustrated in FIG. 3, each of the wheels is equipped with a segmented disc illustrated by discs 214 and 215. The brake members are mounted on the truck and define a pair of link arms 222 and 223 for each brake member. Each of the link arms carries friction pads 224 and 225 which bear against the discs 214 and 215.

The friction brake illustrated in FIG. 3 is actuated by a first hydraulic motor 121. The working space of motor 121 exerts hydraulic pressure against piston member 122 and an opposing countervailing force against the rear wall 251 and housing 120. These opposing forces are transmitted to link arms 222 and 223 through pivot points 253 and 254. The opposing forces generated on either side of working space 121 are thus transmitted through the pivot points 253 and 254 into effective braking force on pads 224 and 225.

The brake actuator illustrated in FIG. 3 also includes a second hydraulic motor 127, and a spring-operated motor 125. Under normal operating conditions, spring motor 125 is restrained by hydraulic fluid in working space 127. Upon a reduction in hydraulic pressure, the belleville springs 125 are allowed to exert their working pressure against piston 126 and thereby actuate the disc brake.

Although belleville springs are capable of exerting great force, they exert it only through a very short working space. Thus it is necessary to insure that the brake pads 224 and 225 are always in close contact with the discs 214 and 215. It is desirable in the design of such a brake to have a working space on the order of 10 to 15 thousandths of an inch. It is therefore necessary to provide a mechanical slack adjuster to insure that the pressure exerted by the belleville springs is transmitted directly to the brake pads rather than being lost in the slack or play present through normal wear in the mechanical linkage.

To provide this mechanical slack adjustment, a freely rotating lead screw 259 with a suitably steep pitch to its threads is journaled for rotation and reciprocation in bearing means 260. The lead screw 259 is threaded into member 261 which is fixably and rigidly secured to piston member 122. The lead screw 259 is capable of approximately 3/16 of an inch of axial travel and is limited in its axial travel by snap ring 262 and by flange member 262. A spring means 264 is also provided to insure that under normal operating circumstances the lead screw 259 is biased to its leftward position as illustrated in FIG. 3 wherein the snap ring 262 engages bearing means 260. Lead screw 259 is also equipped with a conical pressure head 265. Conical head 265 engages a similar and mating surface 266 formed on the inner periphery of piston 126.

In normal operation, working space 127 is pressurized and piston member 126 is urged to its leftward position maintaining a constant bias on belleville springs 125. When the hydraulic motor 121 is actuated, piston means 122 is displaced to the right as illustrated in FIG. 3, and this displacement will rotate lead screw 259 by means of member 261. Spring means 264 is sufficiently resilient to maintain lead screw 259 within a few thousandths of an inch of the position illustrated in FIG. 3 even while it is rotating by virtue of the forces exerted on it by member 261 and piston 122. Thus when a service brake application has been made, and disc brake pads 224 and 225 have been brought into contact with discs 214 and 215, the conical head of the screw will be held within a few thousandths of an inch of this relative position. When the pressure in working space 121 is vented, the service brakes are de-energized. The disc pads are free to retract to whatever degree the separate hydraulic slack adjuster will permit and the screw will not interfere with piston motion in any way.

The spacing between members 265 and 266 is also maintained under normal operating conditions within a few thousandths of an inch. When the hydraulic fluid in motor 22 is vented, the belleville spring motor 125 will displace piston member 126 to the right, urging it into contact with the conical head 265. Once the working surfaces of 265 and 266 have engaged one another, the lead screw 259 will be secured against any further rotation. At this point, the entire force of the belleville spring motor 125 is exerted through piston member 126, lead screw 259, member 261, and piston 122 to the link arms 222 and 223. The reactive forces are then translated around pivot points 253 and 254 to the brake pads 224 and 225.

As was pointed out previously, the system does require a hydraulic slack adjuster and a hydraulic supply means with sufficient capacity to cover the fluid required for working 121 and leakage loss from the second hydraulic motor 127. The slack adjuster previously described with respect to lead screw 259 is a mechanical slack adjuster intended to compensate brake operation for piston motion due to pad wear. It plays no part in service brake operation and does not eliminate the need for hydraulic slack adjustment.

In the preferred embodiment of the invention, the belleville spring motor has a preferred working distance of approximately 3/16 of an inch. This working space must be carefully selected within the belleville spring design parameters since overtravel in the compression direction can destroy the spring, while overtravel in the extension direction will render the spring motor ineffective. In designing this motor, it was assumed that the fully released position for the emergency and handbrake would be achieved with 542 pounds per square inch of hydraulic working pressure. This pressure is below the normal minimum service pressure for a lightly loaded vehicle. The normal service braking application for an average load vehicle was assumed to be 679 pounds per square inch, and this pressurization on the belleville spring motor 126 results in the springs traveling 0.670 inch from their free position and results in compression of the piston against its stop at a load of 11,500 pounds. When the hydraulic motor 127 is vented, and spring motor 125 allowed to apply its fully effective braking force, the maximum overtravel in the extension direction as limited by the position stop is approximately 0.180 inch and corresponds to a load of 8,410 pounds. As is indicated previously, it was necessary to provide differentially sized working areas for the first hydraulic motor 121 and the second hydraulic motor 127. This is to insure that the second hydraulic motor 127 will be capable of fully compressing the springs of spring motor 125 even under lightly loaded conditions.

Once the emergency or handbrake is applied to the vehicle, it is necessary to apply the service brake to de-energize the handbrake or emergency brake. This application fills working space 127 and pressurizes the second hydraulic motor to displace piston 126 to the left as illustrated in FIG. 3 against spring motor 125.

Again in the preferred embodiment, it requires 3.65 cubic inches of oil to release the brakes and approximately 2.96 cubic inches of oil to provide proper pad clearance and the desired overtravel of springs 125. In the preferred embodiment of the invention, the booster capacity has 7.2 cubic inches per stroke, so one service application is sufficient to adequately pressurize the second hydraulic motor 127 and compress the belleville springs 125.

Figure 4:
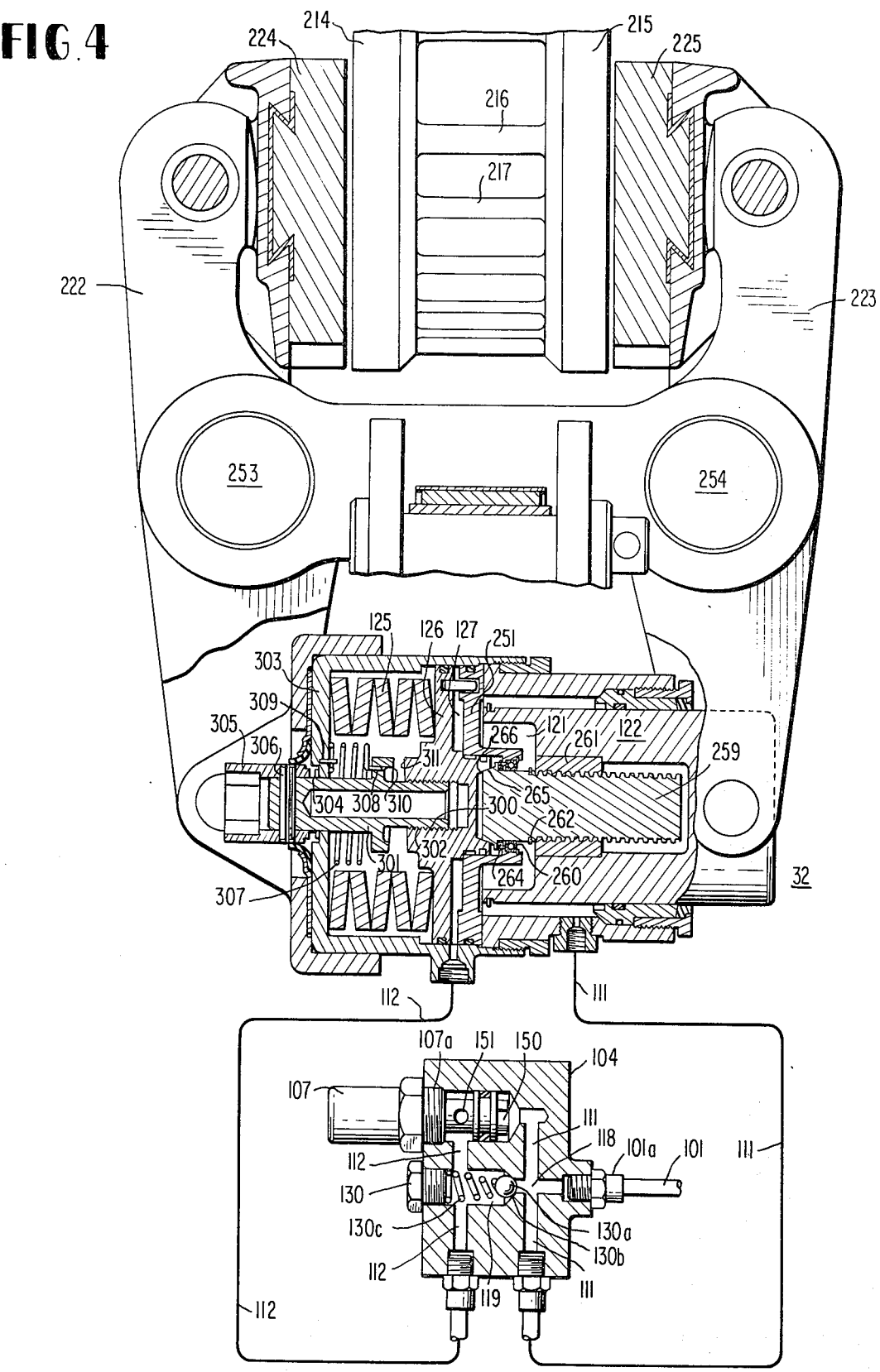
FIG. 4 is a partially cross-sectioned view of an alternate form of the present invention illustrating a manual retractor for the spring-applied brake actuator.

FIG. 4 illustrates in partial cross section an alternate embodiment of the present invention. In this embodiment, a mechanical retraction device has been added for the spring motor 125. As illustrated in FIG. 4, the emergency piston 126 is equipped with internal screw threads 300. These screw threads are engaged by a retraction screw 301 which is equipped with external threads 302. The retraction screw 301 is journaled for rotation and reciprocation in endcap 303, but is fixably restrained from inward reciprocation during retraction by means of thrust washer 304. Retraction screw 301 is rotated by means of a socket drive wrench which is inserted into a standard socket 305. Socket 305 is fixably secured to a retraction screw 301 by means of a pin 306. To retract the emergency piston 126 and compress spring motor 125, a wrench is inserted into socket 305 and rotated in a clockwise manner. Threads 300 and 302 then retract the emergency piston 126 to the left as illustrated in FIG. 4, thereby compressing spring motor 125.

The retraction device also includes a second spring motor 307 which is pinned to both the retraction screw 301 as illustrated at 308 and to the rear wall 303 as indicated at 309. As the retraction screw and socket is rotated in a clockwise manner, spring member 307 is wound, thereby exerting a counterclockwise torque on retraction screw 301. However, the force of the belleville spring motor 125 is so great that substantial friction is generated between the threads 300 and 302 and the thrust washer. Even though spring means 307 is exerting an unwinding bias to a retraction screw 301, retraction screw 301 is held in place by virtue of the friction exerted on screw threads 302 by the spring motor 125.

Lead screw 301 and emergency piston 126 are also equipped with abutments 310 and 311 which provide a definitive stop for any further retraction of the emergency piston 126 by lead screw 301. This prevents an over-compression of the belleville spring motor 125 or inadvertent jamming of threads 300 and 302.

The retraction device is disengaged by pressurizing the second hydraulic motor 127. When a service application is made, or when the service brakes are cycled, the second hydraulic motor 127 is pressurized as hereinbefore previously described. When the pressure in the second hydraulic motor 127 equalizes the bias exerted by spring motor 125, the friction between threads 300 and 302 no longer exits, and the spring means 307 is then free to rotate the retraction screw 301 in a counterclockwise manner to its original position. If desired, the manual retraction device can also be released manually by rotating socket 305 with the wrench in a counterclockwise manner to restore lead screw 301 to its original position.

As illustrated in FIG. 3, the manifold 104 includes an inlet port 101a for the hydraulic supply line. This supply line is from the hydraulic booster of the pneumatic to hydraulic convertor. Since this line supplies the normal service pressure for the vehicle, the oil is diverted at junction 118 to the first supply line 111. Supply line 111 connects with the first hydraulic motor 121 and is used for normal service brake applications. The one-way check valve 130 includes a ball valve having a spherical ball 130a and a conical seat 130b. This ball is held in position by means of a conical spring 130c and provides a check valve function to allow passage of fluid pressure from junction 118 to the second supply line 112 when the pressure in conduit 101 and 111 exceeds that of 112. After several service brake applications have been made at varying pressures, the pressure in conduit 112 may well be higher than that called for in the next service application. If this happens, one-way check valve 130 will prevent the transfer of fluid from passageway 112 to passageway 111. In the event of any leakage through hydraulic motor 127 or check valve 130, the pressure drop is immediately replenished at the next successive service application by virtue of check valve 130.

The emergency and handbrake are normally activated by means of an exhaust valve 107. This exhaust valve is a hich-capacity, fast-response, normally closed magnet valve. It is threadably engaged in manifold 104 by means of threads 107a, and normally blocks communication between passageways 111, and 112. This valve defines an inlet port 150, and an exhaust port 151 which provides communication between conduits 111 and 112 when the valve is open.

Although the present invention has been described with respect to a hydraulic actuator and hydraulic disc brakes, it is fully apparent that the same principles could be utilized in a two-stage pneumatic booster having a first pneumatic service brake portion, and a spring-applied emergency and parking brake which is normally restrained by means of a pneumatic motor rather than a hydraulic motor.

While I have thus described the preferred embodiments of the present invention, other variations will be suggested to those skilled in the art. For example, the system may be installed in a brake system for trucks or other motor vehicles. It must be understood that the foregoing description is meant to be illustrative only, and not limitative of the present invention, and all such variations and modifications as are in accord with the principles described herein, are meant to fall within the scope of the appended claims.

I claim:
1. An emergency and handbrake control system, comprising:
   a. means for supplying fluid under pressure to actuate a friction brake system,
   b. a first actuator means including a first fluid motor for actuating said friction brake system in response to positive variations in fluid pressure,
   c. a second actuator means including a spring motor means for actuating said friction brake system, and a second fluid motor for restraining said spring motor means in response to fluid under pressure,
   d. conduit means for directing fluid under pressure to said first and second fluid motors, including a first supply line for said first fluid motor and a second supply line for said second fluid motor,
   e. means connected between said first and second supply lines for alternatively blocking or establishing fluid communication therebetween irrespective of the pressure level existing in said first fluid motor, thereby equalizing the pressures in said motors when said fluid communication has been estab- lished and preventing over-application of said friction brake system due to an emergency or handbrake application during a service brake application, f. means for establishing one-way communication between said first and second supply lines and permitting a transfer of fluid under pressure from said first supply line to said second supply line when the pressure in the former exceeds the pressure in the latter; and g. emergency and handbrake control means for opening said means for alternatively blocking or establishing communication in response to an emergency or handbrake control signal.

2. An emergency and handbrake control system as claimed in claim 1 wherein said means for alternatively blocking or establishing communication comprises an an electromagnetic valve which establishes fluid communication between said first and second supply lines in response to an electrical control signal.

3. An emergency and handbrake control system as claimed in claim 1 wherein said first and second fluid motors are actuated in response to hydraulic fluid under pressure.

4. An emergency and handbrake control system as claimed in claim 3 wherein said spring motor means comprises a plurality of belleville springs.

5. An emergency and handbrake control system as claimed in claim 1 wherein said means for establishing one-way communication comprises a spring loaded ball check valve.

6. An emergency and handbrake control system as claimed in claim 1 wherein said system includes a hydraulic brake actuator system, said brake actuator system including said first and second fluid motors, with said second fluid motor having a larger pressure-responsive working area than said first fluid motor.

7. In an emergency and handbrake system for use with a friction brake that employs a hydraulic actuator for the friction brake and a spring actuator for the emergency and handbrake, the improvement which comprises;

a. a first hydraulic motor for actuating said friction brake, and a second hydraulic motor for restraining said spring actuator, b. manifold means for communicating hydraulic fluid under pressure to said first and second fluid motors, said manifold means defining a during supply line to said first fluid motor and a second supply line to said second fluid motor, c. means connected between said first and second supply lines for alternatively closing communication between said first and second supply lines furing normal operation; or permitting pressure equalization between said first and second supply lines in response to an emergency or handbrake control signal irrespective of the pressure existing in said first hydraulic motor, thereby equalizing the pressures in said hydraulic motors and preventing over-application of said friction brake due to an emergency or handbrake application during a service brake application;

d. means for establishing one-way communication from said first supply line to said second supply line thereby permitting transfer of hydraulic fluid under pressure from said first supply line to said second supply line when the pressure in the former exceeds in the pressure in the latter, and e. control means for opening said means for alternatively closing communication or permitting pressure equalization.

8. An emergency and handrake control system as claimed in claim 7 wherein each of said motors defines a pressure-responsive working area, and the pressure-responsive working area for said second fluid motor is larger than the pressure-responsive working area for said first fluid motor.

9. An emergency and handbrake control system as claimed in claim 7 wherein said means for alternatively closing communication or permitting pressure equalization comprises an electromagnetic valve which establishes hydraulic communication between said first and second supply lines in response to an electrical control signal.

10. An emergency and handbrake control system as claimed in claim 7 wherein said means for establishing one-way communication comprises a spring loaded ball check valve.

* * * * *